US010090677B2

(12) United States Patent
Okino (10) Patent No.: US 10,090,677 B2
(45) Date of Patent: Oct. 2, 2018

(54) CONTROLLED DEVICE, CONTROL DEVICE, DEVICE CONTROL METHOD, AND DEVICE CONTROL SYSTEM

(71) Applicant: KYOCERA Corporation, Kyoto (JP)

(72) Inventor: Kenta Okino, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 292 days.

(21) Appl. No.: 14/893,901

(22) PCT Filed: May 29, 2014

(86) PCT No.: PCT/JP2014/002856
§ 371 (c)(1),
(2) Date: Nov. 24, 2015

(87) PCT Pub. No.: WO2014/192304
PCT Pub. Date: Dec. 4, 2014

(65) Prior Publication Data
US 2016/0118794 A1    Apr. 28, 2016

(30) Foreign Application Priority Data
May 29, 2013   (JP) .................................. 2013-112685

(51) Int. Cl.
*G05B 15/02*    (2006.01)
*G06Q 50/06*    (2012.01)
(Continued)

(52) U.S. Cl.
CPC ................ *H02J 3/28* (2013.01); *G05B 15/02* (2013.01); *G06Q 50/06* (2013.01); *G08C 17/02* (2013.01);
(Continued)

(58) Field of Classification Search
CPC ........ G05B 15/02; G06Q 50/06; G08C 17/02; H02J 2003/143; H02J 3/14; H02J 3/28;
(Continued)

(56) References Cited

U.S. PATENT DOCUMENTS 7,251,686 B1    7/2007   Tomita
9,308,964 B2    4/2016   Saida
(Continued)

FOREIGN PATENT DOCUMENTS

EP    2 276 144 A2    1/2011
EP    2 544 333 A1    1/2013
(Continued)

OTHER PUBLICATIONS

Aemerican Electric Power "Functional Specification for Community Energy Storage (CES) Unit, Revision 2.2, Dec. 9, 2009".*
(Continued)

*Primary Examiner* — Yuhui R Pan
(74) *Attorney, Agent, or Firm* — Procopio Cory Hargreaves and Savitch LLP (57) ABSTRACT

A controlled device that is capable of executing a predetermined operation set in advance and is also capable of executing an instructed operation in accordance with a control instruction transmitted from a control device that performs power control for the consumer's facility. The controlled device includes a communicator configured to acquire a control instruction from the control device; and a controller configured to execute, when the control instruction has been acquired, the instructed operation in accordance with the control instruction, and to measure, each time the control instruction has been acquired, an elapsed time period that has passed since acquisition of the control instruction, wherein the controller executes the predetermined operation once the elapsed time period since the
(Continued)

previous acquisition of the control instruction has reached a predetermined time period without additional acquisition of the control instruction.

10 Claims, 5 Drawing Sheets (51) Int. Cl.
*H02J 3/28* (2006.01)
*G08C 17/02* (2006.01)
*H02J 3/14* (2006.01)
*H02J 7/34* (2006.01)
*H02J 9/06* (2006.01)

(52) U.S. Cl.
CPC .......... *H02J 3/14* (2013.01); *H02J 7/34* (2013.01); *H02J 9/06* (2013.01); *H02J 2003/143* (2013.01); *Y02B 70/3225* (2013.01); *Y02B 70/3266* (2013.01); *Y02B 70/3291* (2013.01); *Y04S 20/222* (2013.01); *Y04S 20/242* (2013.01); *Y04S 20/248* (2013.01)

(58) Field of Classification Search
CPC ........... H02J 7/34; H02J 9/06; Y02B 70/3225; Y02B 70/3266; Y02B 70/3291; Y04S 20/222; Y04S 20/242; Y04S 20/248
See application file for complete search history.

(56) References Cited

U.S. PATENT DOCUMENTS

| | | | |
|---|---|---|---|
| 2012/0082137 A1 | 4/2012 | Ito | |
| 2012/0316709 A1 | 12/2012 | Saida | |
| 2013/0086409 A1* | 4/2013 | Lu | ............ H04L 12/2807 713/340 |
| 2014/0248802 A1* | 9/2014 | Hieda | ............ H04L 12/2818 439/620.01 |

FOREIGN PATENT DOCUMENTS

| | | |
|---|---|---|
| JP | 2000-307639 A | 11/2000 |
| JP | 2000311273 A | 11/2000 |
| JP | 2006289508 A | 10/2006 |
| JP | 2009-214830 A | 9/2009 |
| JP | 2011-142753 A | 7/2011 |
| JP | 2011-259681 A | 12/2011 |
| JP | 2013-017268 A | 1/2013 |
| JP | 2013-017284 A | 1/2013 |
| WO | 2010/146673 A1 | 12/2010 |
| WO | 2013-046657 A1 | 4/2013 |

OTHER PUBLICATIONS

Office Action dated Nov. 8, 2016 issued by the Japanese Patent Office in Counterpart Japanese Application No. 2015-519653.
International Search Report dated Jul. 22, 2014, issued for International Application No. PCT/JP2014/002856.
Written Opinion of the International Searching Authority issued by Japan Patent Office for International Application No. PCT/JP2014/002856.
Yoshiki Terashima, "Echonet Lite Communication Technology for Home Energy Management System", Toshiba Review, Nov. 1, 2012 (Jan. 11, 2012), vol. 67, No. 11, pp. 37 to 40.
American Electric Power, Functional Specification for Community Energy Storage (CES) Unit, Revision 2.2, Dec. 9, 2009, 22 pages.
Extended European Search Report dated Dec. 9, 2016 issued by the European Patent Office in counterpart European Patent Application No. 14 80 3773.2.

* cited by examiner

CONTROLLED DEVICE, CONTROL DEVICE, DEVICE CONTROL METHOD, AND DEVICE CONTROL SYSTEM

CROSS-REFERENCES TO RELATED APPLICATIONS

The present application claims priority to and the benefit of Japanese Patent Application No. 2013-112685 (filed on May 29, 2013), the entire contents of which are incorporated herein by reference.

TECHNICAL FIELD

The present disclosure relates to a controlled device, a control device, a device control method, and a device control system.

BACKGROUND

In recent years, energy-saving homes, stores, and buildings (hereinafter, collectively called "power consumer's facilities") have been advocated to address concerns about an electric power shortage and to meet demands for environmental protection. Especially in summer and winter seasons when power demand is higher, each power consumer's facility sometimes consumes an amount of power that is greater than a power consumption (hereinafter, called "contract demand") that has been settled by a contract between the power consumer's facility and an electric company. As a way to prevent the amount of power consumed from exceeding the contract demand by effectively saving energy, a power control system including a power control device (for example, Energy Management System: EMS) provided in each power consumer's facility to control load apparatuses used in the power consumer's facility, a decentralized power source installed in the power consumer's facility, and so forth is known. (Refer to Patent Literature 1, for example.)

CITATION LIST

Patent Literature

PTL 1: Japanese Patent Application Publication No. 2013-17268

SUMMARY

Technical Problem

In the event of, for example, a failure in a power management device that controls the apparatuses and some sort of failure in communication between the power management device and the decentralized power source or between the power management device and the load apparatuses, the aforementioned system poses a risk that appropriate power control might be interrupted, thereby failing to prevent the amount of power consumed from exceeding the contract demand.

Accordingly, the present disclosure has been conceived in view of the above problem, and the present disclosure is to provide a controlled device, a control device, a device control method, and a device control system all of which allow appropriate control over the controlled device even when a control instruction transmitted from the control device to the controlled device fails to be delivered due to a communication failure or the like.

Solution to Problem

The first aspect of the present disclosure for solving the aforementioned problem resides in controlled device, to be located at a consumer's facility, that is capable of executing a predetermined operation set in advance and an instructed operation instructed in accordance with a control instruction transmitted from a control device that performs power control of the consumer's facility. The controlled device includes: a communicator configured to acquire the control instruction from the control device; and a controller configured to execute, when the control instruction is acquired, the instructed operation in accordance with the control instruction, and to measure, each time the control instruction is acquired, an elapsed time period since acquisition of the control instruction. The controller executes the predetermined operation when the elapsed time period since the acquisition of the control instruction reaches a predetermined time period without additional acquisition of the control instruction.

In a preferred embodiment of the controlled device according to the first aspect, the predetermined operation includes a series of operations changing over time in accordance with a predetermined schedule.

In another preferred embodiment of the controlled device according to the first aspect, the control device further includes: a storage storing the predetermined time period in advance.

In yet another preferred embodiment of the controlled device according to the first aspect, the controller controls the communicator to notify the control device of the predetermined time period.

In yet another preferred embodiment of the controlled device according to the first aspect, the control instruction includes information indicating a period of validity, and the predetermined time period is based on the period of validity.

In yet another preferred embodiment of the controlled device according to the first aspect, power management within a reference time period is performed over the consumer's facility.

In yet another preferred embodiment of the controlled device according to the first aspect, the controlled device includes an energy storage cell, and the predetermined operation includes discharging.

In yet another preferred embodiment of the controlled device according to the first aspect, the controller resets the measurement of elapsed time period each time the reference time period has elapsed.

In yet another preferred embodiment of the controlled device according to the first aspect, the predetermined time period is shorter than the reference time period.

In yet another preferred embodiment of the controlled device according to the first aspect, the control instruction includes a SET command defined in the ECHONET Lite™ specification.

The second aspect of the present disclosure resides in a controlled device, to be located at a consumer's facility, that is capable of executing a predetermined operation set in advance and an instructed operation in accordance with a control instruction transmitted from a control device that performs power control for the consumer's facility. The controlled device includes: a communicator configured to acquire the control instruction from the control device; and a controller configured to measure an elapsed time period since acquisition of the control instruction. When the control instruction from the control device is not acquired within a predetermined time period, the predetermined operation is executed.

The third aspect of the present disclosure resides in a control device configured to control a controlled device located at a consumer's facility to execute an instructed operation by transmitting a control instruction to the controlled device. The control device includes: a controller configured, when controlling the controlled device to execute the instructed operation, to transmit to the controlled device a control instruction indicating the instructed operation repeatedly at a predetermined interval.

The fourth aspect of the present disclosure resides in a controlled device to be located in a consumer's facility, that is capable of executing a predetermined operation set in advance and an instructed operation in accordance with a control instruction transmitted from a control device that performs power control for the consumer's facility. The device control method includes steps of: acquiring the control instruction from the control device; executing, when the control instruction is acquired, the instructed operation in accordance with the control instruction; measuring, each time the control instruction is acquired, an elapsed time period since acquisition of the control instruction; determining whether or not the elapsed time period since the acquisition of the control instruction has reached a predetermined time period without additional acquisition of the control instruction; and executing the predetermined operation when it is determined that the elapsed time period reaches the predetermined time period.

The fifth aspect of the present disclosure resides in a device control system including: a control device that performs power control for a consumer's facility; and a controlled device, to be located in the consumer's facility, and that is capable of executing a predetermined operation set in advance. The control device is configured to transmit, at a predetermined interval, a control instruction that is to be executed by the controlled device. The controlled device includes a controller configured to execute, when the control instruction is acquired, an instructed operation in accordance with the control instruction, and to measure, each time the control instruction is acquired, an elapsed time period since acquisition of the control instruction. The controller executes the predetermined operation once the elapsed time period since the acquisition of the control instruction reaches a predetermined time period without additional acquisition of the control instruction.

Advantageous Effect

The controlled device, the control device, the device control method, and the device control system with the above configurations according to the present disclosure allow appropriate control over the apparatuses even when a control instruction fails to be delivered due to a communication failure or the like.

DETAILED DESCRIPTION

Preferred embodiments of the present disclosure will be described below.

Embodiments

To begin with, a description is given of an exemplary power control system that employs a device control system including an energy storage device, as one of exemplary controlled devices, and a power control device, as one of exemplary control devices, according to one of embodiments of the present disclosure. The power control system according to the present embodiment includes one or more decentralized power sources in addition to power feed from an electric power grid (commercial power source). The description herein describes an example in which an energy storage device is included as the one or more decentralized power sources. However, the decentralized power sources are not limited to any type, and any number of decentralized power sources of any types may be selected. Examples of the decentralized power sources include a variety of power generation systems, including a photovoltaic power generation system, a fuel cell such as a Solid Oxide Fuel Cell (SOFC), and a gas power generator that generates electricity by using a gas fuel, that may be used in alone or in combination of two or more.

Figure 1:
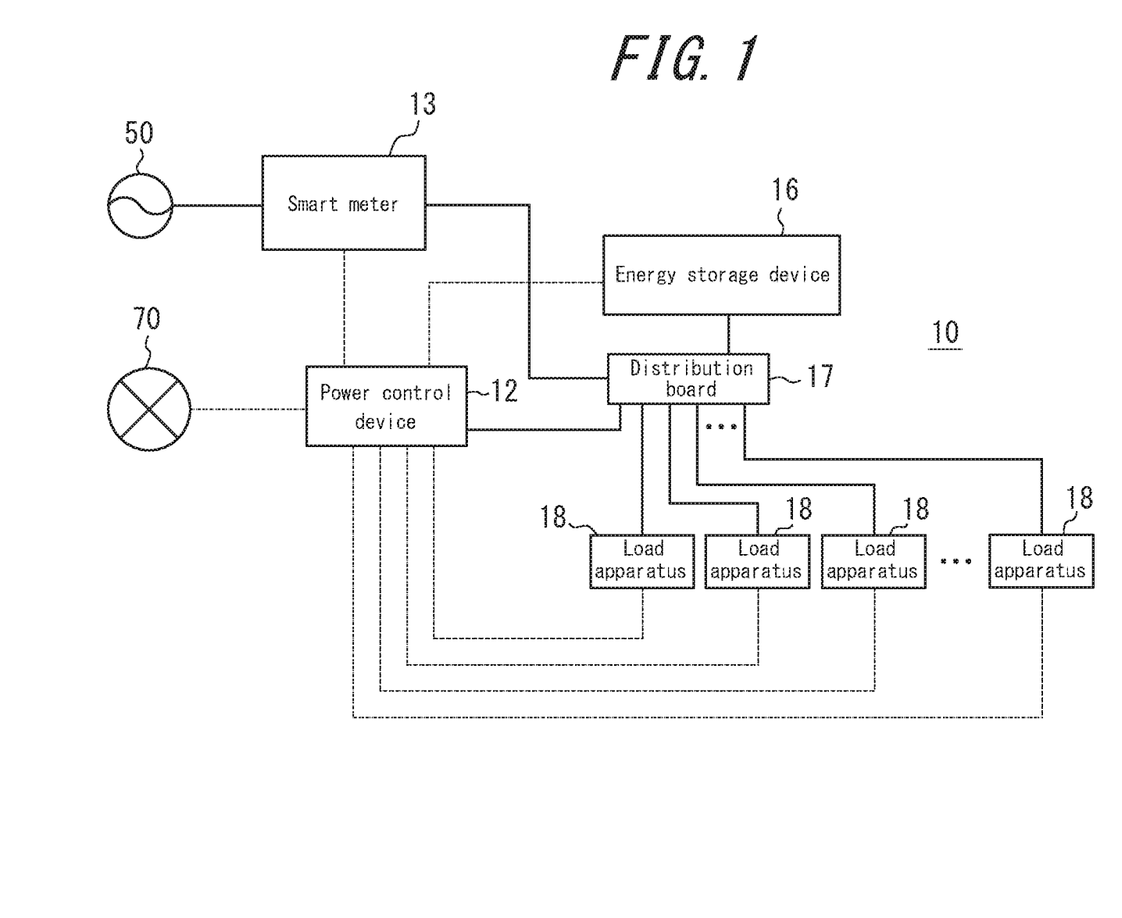
FIG. 1 is a function block diagram illustrating a schematic configuration of a power control system including an energy storage device according to one of embodiments of the present disclosure.

FIG. 1 is a block diagram illustrating a schematic configuration of a power control system 10 including an energy storage device 16 and a power control device 12 according to the embodiment of the present disclosure. The power control system 10 according to the embodiment of the present disclosure includes the power control device 12, a smart meter 13, the energy storage device 16, a distribution board 17, and load apparatuses 18.

In FIG. 1, a solid line connecting the function blocks represents flow of electric power. A broken line connecting the function blocks in FIG. 1 represents flow of a control signal or information to be communicated. Such communication represented by the broken line may be wired or wireless communication. In cases where wired communication is chosen, examples of such wired communication include serial bus communication using a cable according to the RS-232C, the RS-485, or other standards, and Local Area Network (LAN) communication using the Ethernet™ protocol or the like. However, wired communication is not limited to these examples. Additionally, when connected directly by, for example, a cross cable, the apparatuses may communicate directly with each other without the need to connect to a repeater such as a HUB. On the other hand, in cases where wireless communication is chosen, a wireless LAN communication system or the like that involves the use of relay devices such as a wireless router and an access point may be adopted. Other communication systems, including an ad hoc and a Wi-Fi Direct™, that allow direct communication without the need to connect to a relay device may also be adopted.

A variety of systems may be adopted both for a physical layer and a logical layer in communication of a control signal and information. For example, communication using a near field communication technology, such as ZigBee™, may be adopted in communication between the power control device 12, the smart meter 13, and the energy storage device 16. Furthermore, a variety of transmission media, including infrared communication and Power Line Communication (PLC), may be used in communication between the power control device 12 and the load apparatuses 18. Moreover, on the physical layer suitable for each communication, different types of protocols may be combined with each other: for example, a communication protocol defining the higher layer while imparting a degree of freedom to the physical layer, such as ZigBee SEP 2.0 (Smart Energy Profile 2.0) or ECHONET Lite™, may be combined with a communication protocol defining the physical layer, such as Wi-Fi or PLC. The description below uses an example in which ECHONET Lite™ is employed for the power control device 12 to communicate with the smart meter 13, the energy storage device 16, and the load apparatuses 18.

The power control system 10 may supply, to the load apparatuses 18 and the power control device 12, power that has been supplied from a commercial power source 50 and power that has been charged in and discharged from the energy storage device 16.

The power control device 12 controls and manages power in the apparatuses included in the power control system 10 illustrated in FIG. 1. A detailed description will be given below of a configuration of the power control device 12.

The smart meter 13 is connected to the commercial power source 50 to measure power supplied from the commercial power source 50. The smart meter 13 may also inform the power control device 12 of the measured power.

The energy storage device 16 may supply power by discharging power charged therein. A detailed description will be given below of a configuration of the energy storage device 16.

The distribution board 17 divides the supplied power into a plurality of subsidiary circuit branches for distribution to the load apparatuses 18. Herein, some subsidiary circuit branches each connect directly to a typical load apparatus 18 that consumes a lot of power, and other subsidiary circuit branches each connect to a set of load apparatuses 18 located in a different room. In the former case, the load apparatus 18 may be, for example, an air conditioner, a refrigerator, or an IH cooking heater. In the latter case, the set of load apparatuses 18 may be connected to receptacles provided in the corresponding room, and any load apparatuses may be connected to the receptacles.

In FIG. 1, any number of the load apparatuses 18 may be connected to the power control system 10. These load apparatuses 18 may be various electric appliances, some examples of which include a television, an air conditioner, and a refrigerator. The load apparatuses 18 are supplied with power via the distribution board 17.

Subsequently, a further description is given of the power control device 12.

Figure 2:
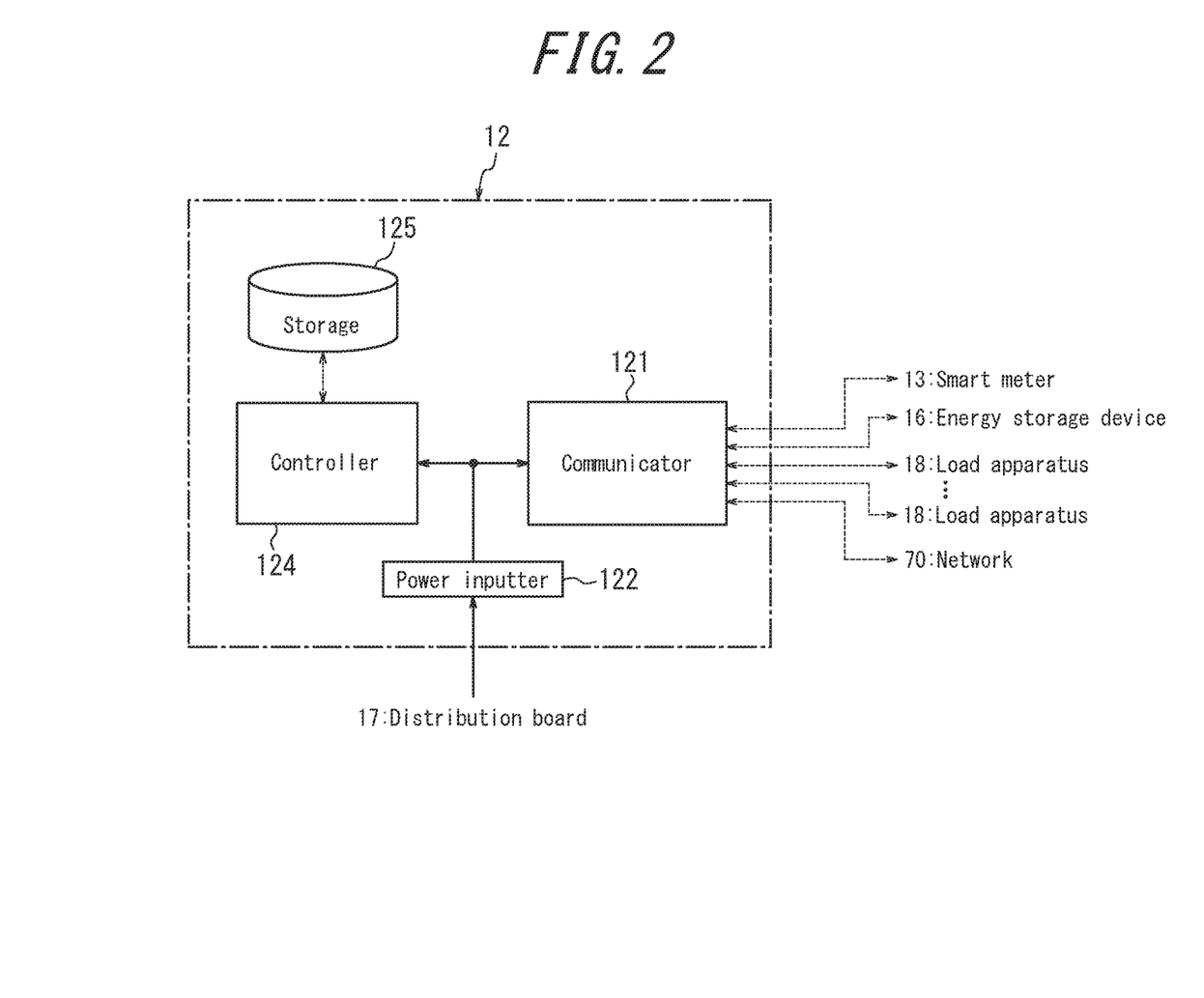
FIG. 2 is a function block diagram illustrating a schematic configuration of a power control device according to one of embodiments of the present disclosure.

FIG. 2 is a function block diagram illustrating a schematic configuration of the power control device 12 according to one of embodiments of the present disclosure. The power control device 12 is, for example, an EMS, and the power control device 12 includes a communicator 121, a power inputter 122, a controller 124, and a storage 125.

The communicator 121 is, for example, an interface, and the communicator 121 serves as an intermediate that transmits/receives a control signal from the controller 124 and information from the smart meter 13, the energy storage device 16, and the load apparatuses 18.

For example, the communicator 121 may acquire, from the smart meter 13, information regarding buying power and/or selling power of the commercial power source 50. Through the smart meter 13, the communicator 121 may also acquire, from, for example, an electric company, Demand Response (DR) instruction information (hereinafter, called "power use restriction instruction") regarding restriction on consumption of power. Furthermore, the communicator 121 may acquire, via sensors mounted to the subsidiary circuit branches, sensor data regarding power supplied from the energy storage device 16 and the commercial power source 50 to the load apparatuses 18 through the subsidiary circuit branches into which the power has been divided by the distribution board 17. Moreover, the communicator 121 may directly acquire an amount of power charged (i.e., charged power) in the energy storage device 16. Moreover, the communicator 121 may acquire, directly from each load apparatus 18, the power consumption. Moreover, the communicator 121 may acquire, from a network 70 including the Internet, a variety of information.

The power inputter 122 receives power supply from the commercial power source 50 and the energy storage device 16 via the smart meter 13 and the distribution board 17.

Based on a variety of information, such as the sensor data, that the communicator 121 has acquired, the controller 124 generates a control signal for controlling power in each apparatus included in the power control system 10.

The controller 124 transmits a control instruction, such as a charge instruction, a discharge instruction, a stop instruction, and a charge restriction instruction, to the energy storage device 16 via the communicator 121.

The controller 124 also acquires and accumulates the information that the communicator 121 has acquired in order to manage power in each apparatus included in the power control system 10. For accumulation of the variety of information, such as the sensor data, that the controller 124 has acquired, the present power control system 10 includes the storage 125. The storage 125 may be connected externally to the power control device 12 or may be included in the power control device 12. Examples of the storage 125 include a flash memory, an SD card, and so forth.

Herein, for accumulation of the variety of information, such as the sensor data, that the controller 124 has collected, similarly, the power control device 12 may transmit the acquired data to an external server via the network 70 to store (backup) the data in the external server.

The controller 124 may also calculate an estimated value of power consumption (hereinafter, called "estimated power consumption value") within a reference time period based on the sensor data acquired before a power failure. The controller 124 may determine whether the calculated estimated power consumption value might exceed a predetermined amount of power that may be used. Preferably, the predetermined value equals the power consumption that is allowed per reference time period, although the predetermined value is not limited to this example and may be a value less than the allowed power consumption. For example, the predetermined value may be 80% of the allowed power consumption. At this time, when the estimated power consumption value is greater than or equal to the predetermined value, the amount of power actually used is relatively likely to exceed the power consumption allowed in the reference time period. Accordingly, the power control device 12 preferably transmits a control instruction, such as a discharge instruction, to the energy storage device 16.

A reference time period (i.e., a demand time limit) herein refers to a time period on the basis of which a contract demand is to be settled between a company (i.e., a consumer's facility) operating stores or the like and an electric company. Assume, for example, a case where the reference time period is set 30 minutes and the contract demand is set 300 kw, the company is allowed to consume an average of 300 kw of electric power per reference time period. An elapsed time period between the current time and the commencement of the reference time period may be determined, for example, by the smart meter 13 providing information regarding time or by a system clock built in the power control device 12.

Figure 3:
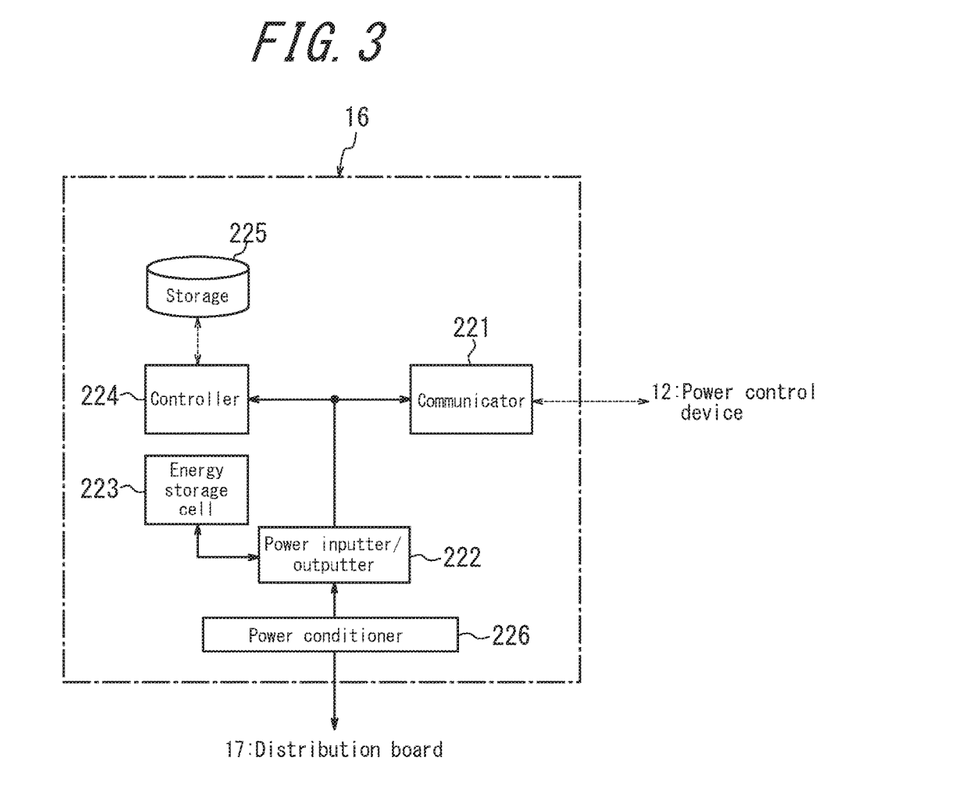
FIG. 3 is a function block diagram illustrating a schematic configuration of an energy storage device according to one of embodiments of the present disclosure.

Subsequently, a further description is given of the energy storage device 16.

FIG. 3 is a function block diagram illustrating a schematic configuration of the energy storage device 16 according to one of embodiments of the present disclosure. The energy storage device 16 includes a communicator 221, a power inputter/outputter 222, an energy storage cell 223, a controller 224, a storage 225, and a power conditioner 226. The energy storage system 16 may be charged with power that has been supplied from the commercial power source 50 and may also supply, to the load apparatuses 18 and the power control device 12, power discharged from the energy storage device 16.

The communicator 221 may acquire a variety of information, including a control instruction, from the power control device 12. The communicator 221 may also inform the power control device 12 of the variety of information to notify which one of charging, stopping, and discharging the current status is.

The power inputter/outputter 122 receives power supply from the commercial power source 50 via the smart meter 13 and the distribution board 17. The power inputter/outputter 222 may also supply the power discharged from the energy storage cell 223 to the load apparatuses 18 via the distribution board 17. The power conditioner 226 may convert direct-current power to alternating-current power and vice versa.

The energy storage cell 223 may be charged with the power supplied from the commercial power source 50 via the power inputter/outputter 222, the distribution board 17, and so forth, and the energy storage cell 223 may also supply the charged power to the load apparatuses 18 and so forth by discharging.

The controller 224 controls charging and discharging of the energy storage cell 223 in accordance with information such as a control instruction that the communicator 221 has acquired. The controller 224 may also inform the power control device 12 of information indicating the current charge/discharge status of the energy storage cell 223 via the communicator 221.

The controller 224 may accumulate, in the storage 225, the variety of information that the communicator 221 has acquired, and the controller 224 may also acquire information accumulated in the storage 225. The controller 224 may accumulate, in the storage 225, information indicating a predetermined operation that is to be executed when a control instruction from the power control device 12 fails to be delivered due to a communication failure or other reasons. The predetermined operation may be an operation of starting one of charging, discharging, and stopping, regardless of any conditions, such as time. The predetermined operation may also be a series of operations scheduled in accordance with time, date, or the like. Concrete examples of such a series of scheduled operations include executing charging during nighttime when an amount of power used is expected to be lower, executing discharging during a time zone of daytime when an amount of power used is expected to be especially higher, and stopping service during the remaining time. The scheduled operations may be set as appropriate. Details (operation statuses over time) of the scheduled operations may be stored in advance in the storage 225. The controller 224 may also measure time by the built-in system clock or the like and may, for example, measure a time period (an elapsed time period) that has passed since acquisition of a control instruction. Furthermore, the controller 224 may reset the measurement of elapsed time period each time the reference time period has elapsed.

Upon acquisition of a control instruction from the power control device 12, the energy storage device 16 executes the instructed operation in accordance with the control instruction. The instructed operation may include a charging, a discharging, and a stopping operation. When the elapsed time period that has passed since the acquisition of the control is greater than or equal to a predetermined time period, the energy storage device 16 may also start a predetermined operation. Herein, the power control device 12 may control the energy storage device 16 continuously by transmitting the control instruction repeatedly to the energy storage device 16 at an interval that is shorter than the predetermined time period.

The predetermined time period may be set in advance and stored in the storage 225. The predetermined time period may also be defined as a period of validity of the control instruction transmitted from the power control device 12. The period of validity of the control instruction may be uniquely assigned to each controlled device, such as the energy storage device 16, or may be commonly assigned to all the apparatuses included in the system. The period of validity may be set differently from one control instruction to another. The period of validity may also be set differently depending on the contents of the control instructions. In detail, for example, the period of validity of a charge instruction may be set 10 minutes, the period of validity of a discharge instruction may be set 20 minutes, and the period of validity of a stopping instruction may be set 1 hour. The period of validity of each control instruction may be set by the power control device 12 or by the energy storage device 16. The period of validity of each control instruction may be mutually notified between the power control device 12 and the energy storage device 16 at the time of, for example, transmission and reception of the control instruction. Additionally, the power control device 12 and the energy storage device 16 are specified to exchange information, including ECHONET objects (EOJ) indicating object types, an ID that is unique to the devices, and a list of instances, and so forth, when negotiating with each other to establish connection. Information including the period of validity of the control instruction may be exchanged at the time of the negotiation.

The following describes a concrete method of notifying the period of validity of the control instruction. ECHONET Lite™ defines commands such as SET, GET, and INFO, and the power control device 12 may instruct the energy storage device 16, for example, to execute an operation by using a SET command. The power control device 12 may also request information, such as the current operation status, from the energy storage device 16 by using a GET command. The energy storage device 16 may notify and inform the power control device 12 of a variety of information by using an INFO command. In the present embodiment, when, for example, providing a control instruction to the energy storage device 16 by using a SET command, the power control device 12 may generate and transmit a signal incorporating information indicating the period of validity.

Furthermore, when notifying the power control device 12 of a variety of information, such as the operation status, the energy storage device 16 may generate and transmit a signal incorporating information indicating the period of validity of the control instruction.

Figure 4:
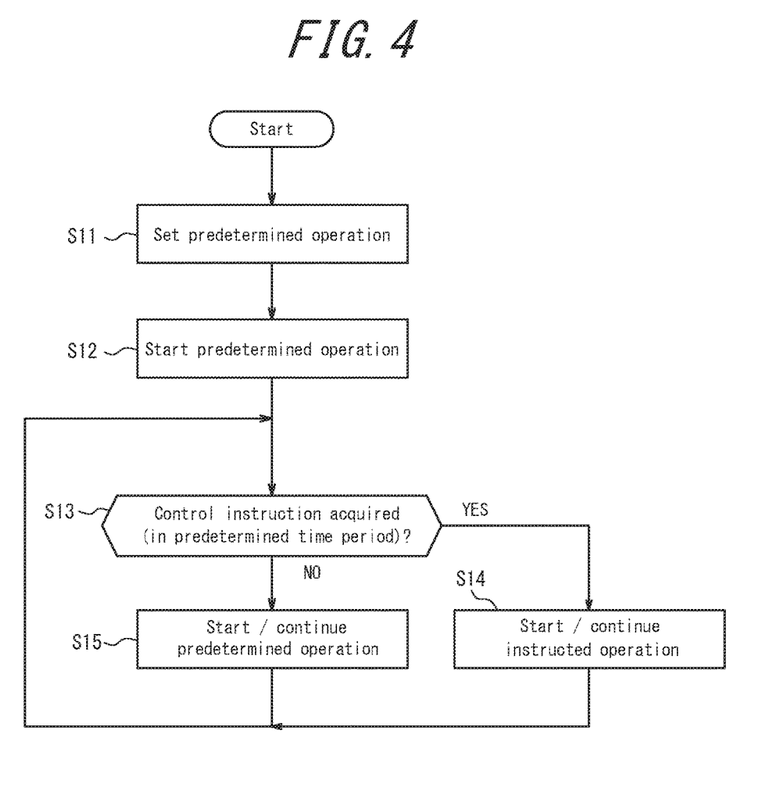
FIG. 4 is a flowchart illustrating operation of an energy storage device according to one of embodiments of the present disclosure.

In the following, a description is given of operation of the energy storage device 16 and the power control device 12 according to one of embodiments of the present disclosure with reference to a flowchart of FIG. 4.

Firstly, the energy storage device 16 sets a predetermined operation (Step S11). Subsequently, the energy storage device 16 still executes the predetermined operation until acquiring a control instruction from the power control device 12 (Step S12).

Subsequently, when having acquired a control instruction from the power control device 12 ("YES" in Step S13), the energy storage device 16 executes an instructed operation in accordance with the acquired control instruction (Step S14), and processing moves to Step S13 again.

When not having acquired a control instruction from the power control device 12 ("NO" in Step S13), the energy storage device 16 executes the predetermined operation in accordance with information associated with the predetermined operation set in Step S11 (Step S15), and processing moves to Step S13 again. Subsequently, processing of Step S13 through Step S15 is repeated.

Figure 5:
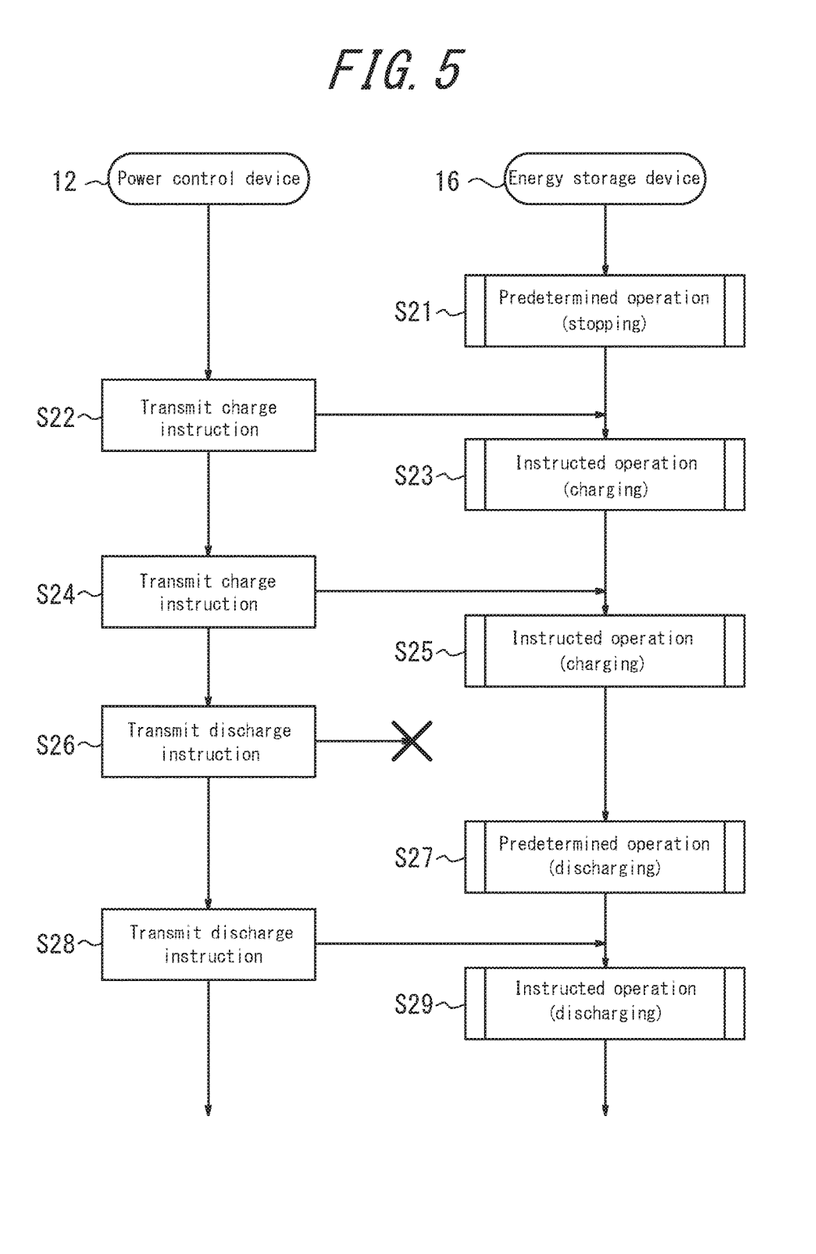
FIG. 5 is a flowchart illustrating operation of a device control system including an energy storage device according to one of embodiments of the present disclosure.

In the following, a description is given of operation of the energy storage device 16 and the power control device 12 according to one of embodiments of the present disclosure with reference to an example illustrated in a flowchart of FIG. 5. The illustrated example is described under the assumption that the predetermined operation and the predetermined time period are set in the energy storage device 16 (stored in the storage 225) in advance.

Firstly, when not having acquired a control instruction, the energy storage device 16 executes the predetermined operation (stopping, in this example) in accordance with the information associated with the predetermined operation that is stored in the storage 225 (Step S21).

When, for example, determining that sufficient power remains unused in the reference time period based on information, such as the power consumption and the reference time period, the power control device 12 transmits a charge instruction to the energy storage 16 (Step S22). Upon acquisition of the charge instruction from the power control device 12, the energy storage device 16 starts the instructed operation, namely, charging (Step S23).

Subsequently, when instructing the energy storage device 16 to continue charging, the power control device 12 transmits a charge instruction again to the energy storage device 16 before the predetermined time period has elapsed (Step S24). When having acquired the additional charge instruction from the power control device 12 before the predetermined time period has elapsed since the previous acquisition of the control instruction, the energy storage device 16 continuously executes the instructed operation, namely, charging (Step S25).

When, for example, determining that sufficient power does not remain unused in the reference time period based on information, such as the power consumption and the reference time period, the power control device 12 transmits a discharge instruction to the energy storage 16 (Step S26). Then, when the control instruction fails to reach the energy storage 16 due to a router breakdown, a communication failure, or the like, the energy storage device 16, although being engaged in charging, starts to execute the predetermined operation (discharging, in this example) once the predetermined time period has elapsed since the previous acquisition of the control instruction (Step S27). The above operation allows a reduction in power consumption than when charging is continued, thereby preventing the amount of power consumed from exceeding the contract demand per reference time period settled with the electric company.

Subsequently, the power control device 12 transmits a discharge instruction again to the energy storage device 16 (Step S28). When communication has been recovered, the energy storage device 16 acquires the discharge instruction from the power control device 12 and starts the instructed operation, namely, discharging (Step S29).

The energy storage device 16 according to the present embodiment is capable of reducing the amount of power consumed, by executing the predetermined operation even when failing to acquire the control instruction from the power control device 12 due to a communication failure or the like. The predetermined operation that the energy storage device 16 executes at this time is preferably an operation of at least restricting or stopping charging, and more preferably discharging, especially during a time zone when the amount of power used is higher.

Modifications

Although, in the above embodiment, information indicating the predetermined operation is held (stored) in the energy storage device 16, the present disclosure is not limited to the embodiment. The power control device 12 may hold (store) information indicating the predetermined operation, and a control instruction may be transmitted from the network 70.

In this case, a control instruction is transmitted from the network 70 as illustrated in FIG. 1 to the energy storage device 16 via the power control device 12. The controller 124 included in the power control device 12 as illustrated in FIG. 2 acquires the control instruction from the network 70 through the communicator 121 and subsequently transmits the acquired control instruction to the energy storage device 16 through the communicator 121. In this case, furthermore, the controller 124 included in the power control device 12 may measure time by the built-in system clock or the like and may, for example, measure a time period (an elapsed time period) that has passed since acquisition of the control instruction. Furthermore, the controller 124 may reset the measurement of elapsed time period each time the reference time period has elapsed. Once the predetermined time period has elapsed since the previous acquisition of the control instruction without additional acquisition of a control instruction, the controller 124 included in the power control device 12 retrieves, from the storage 125, information indicating the predetermined operation and transmits a control instruction to the energy storage device 16 to instruct the energy storage device 16 to execute the predetermined operation. The energy storage 16 executes the predetermined operation in accordance with the control instruction received from the power control device 12.

According to the present disclosure, even when a control instruction from the network 70 fails to be delivered to the power control device 12 due to a communication failure between the network 70 and the power control device 12, a halt of a relay device caused by a power failure, or the like, appropriate power control to prevent the amount of power consumed from exceeding the contract demand is achieved by the energy storage device 16 executing the predetermined operation. Furthermore, since the energy storage device 16 in the present embodiment does not need to store information indicating the predetermined operation, the configuration of the energy storage device 16 is even more simplified, and cost of the energy storage device 16 per se is reduced.

Herein, the energy storage device 16 may also include a manual control terminal such as a remote control, and a manual control instruction may be delivered to the energy storage device 16 directly by using the manual control terminal. In this case, a period of validity may be set for the manual control instruction. In this case, furthermore, the energy storage device 16 may notify the power control device 12 of acquisition of the control instruction, and the power control device 12 may determine a control instruction to be transmitted to the energy storage device 16 based on the content of the notified control instruction.

Furthermore, when operation of the apparatuses has changed due to a schedule, such as maintenance operation, that lasts a longer period than one day, the apparatuses may notify the power control device 12, and the power control device 12 may determine the content of a control instruction based on the content of the notification.

Moreover, the energy storage device 16 may measure the amount of power consumed and may also set a threshold value for the amount of power consumed. When the energy storage device 16 has not acquired a control instruction from the power control device 12 for the predetermined time period or longer, and when the amount of power consumed exceeds the threshold value, the energy storage device 16 may discharge an amount of power that corresponds to the difference from the threshold.

Herein, a computer may be preferably used to serve as the power control device 12. Such a computer may be achieved by storing, in a storage medium of the computer, a program describing contents of processing required for functions of the power control device 12 and by causing a Central Processing Unit (CPU) or a Digital Signal Processor (DSP) of the computer to read and execute the program.

Although the present disclosure has been described based on the drawings and the embodiments thereof, it is to be noted that a person skilled in the art may easily make various changes and modifications according to the present disclosure. Therefore, such changes and modifications are to be understood as included within the scope of the present disclosure. For example, functions and so forth included in various means, steps, or the like may be rearranged in any logically consistent way. Furthermore, means and steps may be combined into one or may be divided.

REFERENCE SIGNS LIST

10 power control system
12 power control device (control device)
13 smart meter
16 energy storage device (controlled device)
17 distribution board
18 load apparatus
50 commercial power source
70 network
121 communicator
122 power inputter
124 controller
125 storage
221 communicator
222 power inputter/outputter
223 energy storage cell
224 controller
225 storage
226 power conditioner

The invention claimed is:

1. An energy storage device, to be located at a consumer's facility, that is capable of executing a predetermined operation set in advance and an instructed operation instructed in accordance with a control instruction transmitted from a control device that performs power control of the consumer's facility, the energy storage device comprising:

an energy storage cell;
a communicator configured to acquire the control instruction from the control device; and
a controller configured to execute, when the control instruction is acquired, the instructed operation in accordance with the control instruction, and to measure, each time the control instruction is acquired, an elapsed time period since acquisition of the control instruction,
wherein the controller executes the predetermined operation when the elapsed time period since the acquisition of the control instruction reaches a predetermined time period without additional acquisition of the control instruction, and
wherein the predetermined operation is to discharge the energy storage cell when an estimated value of power consumption exceeds a predetermined amount of power within a reference time period, wherein the predetermined time period is shorter than the reference time period.

2. The energy storage device of claim 1, wherein the predetermined operation includes a series of operations changing over time in accordance with a predetermined schedule.

3. The energy storage device of claim 1, further comprising: a storage storing the predetermined time period in advance.

4. The energy storage device of claim 3, wherein the controller controls the communicator to notify the control device of the predetermined time period.

5. The energy storage device of claim 1, wherein the control instruction includes information indicating a period of validity, and the predetermined time period is based on the period of validity.

6. The energy storage device of claim 1, wherein power management within the reference time period is performed over the consumer's facility.

7. The energy storage device of claim 6, wherein the controller resets the measurement of elapsed time period each time the reference time period has elapsed.

8. A controlled device, to be located at a consumer's facility, that is capable of executing a predetermined operation set in advance and an instructed operation in accordance with a control instruction transmitted from a control device that performs power control for the consumer's facility, the controlled device comprising:

a communicator configured to acquire the control instruction from the control device; and
a controller configured to measure an elapsed time period since acquisition of the control instruction,
wherein when the control instruction from the control device is not acquired within a predetermined time period, the predetermined operation is executed, wherein the predetermined operation is to discharge an energy storage cell when an estimated value of power consumption exceeds a predetermined amount of power within a reference time period, wherein the predetermined time period is shorter than the reference time period.

9. A device control method performed in a controlled device to be located in a consumer's facility, that is capable of executing a predetermined operation set in advance and an instructed operation in accordance with a control instruction transmitted from a control device that performs power control for the consumer's facility, the device control method including steps of:

acquiring the control instruction from the control device;

executing, when the control instruction is acquired, the instructed operation in accordance with the control instruction;

measuring, each time the control instruction is acquired, an elapsed time period since acquisition of the control instruction;

determining whether or not the elapsed time period since the acquisition of the control instruction has reached a predetermined time period without additional acquisition of the control instruction; and executing the predetermined operation when it is determined that the elapsed time period reaches the predetermined time period, wherein the predetermined operation is to discharge an energy storage cell when an estimated value of power consumption exceeds a predetermined amount of power within a reference time period, wherein the predetermined time period is shorter than the reference time period.

10. A device control system comprising:

a control device that performs power control for a consumer's facility; and a controlled device, to be located in the consumer's facility, that is capable of executing a predetermined operation set in advance, wherein the control device is configured to transmit, at a predetermined interval, a control instruction that is to be executed by the controlled device; and the controlled device includes a controller configured to execute, when the control instruction is acquired, an instructed operation in accordance with the control instruction, and to measure, each time the control instruction is acquired, an elapsed time period since acquisition of the control instruction, and the controller executes the predetermined operation once the elapsed time period since the acquisition of the control instruction reaches a predetermined time period without additional acquisition of the control instruction, wherein the predetermined operation is to discharge an energy storage cell when an estimated value of power consumption exceeds a predetermined amount of power within a reference time period, wherein the predetermined time period is shorter than the reference time period.

* * * * *